United States Patent [19]

Lefler, III

[11] Patent Number: 4,504,621

[45] Date of Patent: Mar. 12, 1985

[54] CLAY FILLED SILICONE ELASTOMERIC EMULSIONS

[75] Inventor: Harold V. Lefler, III, Sanford, Mich.

[73] Assignee: Dow Corning Corporation, Midland, Mich.

[21] Appl. No.: 566,241

[22] Filed: Dec. 28, 1983

[51] Int. Cl.³ .................... C08K 3/22; C08L 83/06
[52] U.S. Cl. ................................ 524/783; 524/863; 524/588; 524/837; 106/287.12
[58] Field of Search ............... 524/837, 863, 588, 783; 106/287.12

[56] References Cited

U.S. PATENT DOCUMENTS

| | | | |
|---|---|---|---|
| 3,137,670 | 6/1964 | Maneri | 524/407 |
| 3,142,655 | 7/1964 | Bobear | 524/588 |
| 3,162,722 | 12/1964 | Bartos | 174/120 |
| 3,294,725 | 12/1966 | Findlay et al. | 260/29.2 M |
| 3,696,127 | 10/1972 | Matherly | 524/837 |
| 3,711,520 | 1/1973 | Pfeifer | 524/588 |
| 3,821,140 | 6/1974 | Milbert | 524/588 |
| 3,836,503 | 9/1974 | Schultz | 524/863 |
| 3,865,778 | 2/1975 | Christie | 524/588 |
| 3,957,714 | 5/1976 | Clark | 524/863 |
| 4,052,357 | 10/1977 | Marinik | 524/588 |
| 4,101,499 | 7/1978 | Herzig | 524/863 |
| 4,221,688 | 9/1980 | Johnson et al. | 260/29.2 M |
| 4,248,768 | 2/1981 | Fraleigh | 524/588 |
| 4,427,811 | 1/1984 | Elias | 524/588 |
| 4,433,096 | 2/1984 | Bokerman | 524/588 |

*Primary Examiner*—C. Warren Ivy
*Attorney, Agent, or Firm*—Edward C. Elliott

[57] ABSTRACT

A silicone elastomer obtained by drying an aqueous silicone elastomeric emulsion containing an anionically stabilized hydroxyl endblocked polydiorganosiloxane, colloidal silica, alkyl tin salt, and clay exhibits weight loss and embrittlement on exposure to elevated temperature. It has been found that the rate of weight loss can be reduced by the addition of greater than 2 parts by weight of finely divided zinc oxide per 100 parts of polydiorganosiloxane by weight to the emulsion.

6 Claims, No Drawings

CLAY FILLED SILICONE ELASTOMERIC EMULSIONS

BACKGROUND OF THE INVENTION

1. Field of the Invention

This invention relates to aqueous silicone emulsions which provide an elastomeric product upon removal of the water under ambient conditions.

2. Description of the Prior Art

A method of polymerizing organosiloxanes in an aqueous emulsion using a surface active sulfonic acid catalyst is described by Findlay et al. in U.S. Pat. No. 3,294,725, issued Dec. 27, 1966. They teach neutralization of the emulsion with a base to a pH of approximately 7 for maximum stability. They obtain emulsions of non-gelled fluid. They described tough rubbery films obtained by adding colloidal silica filler to their emulsion and breaking the mixed emulsion.

Johnson et al. in U.S. Pat. No. 4,221,688, issued Sept. 9, 1980, teach a silicone emulsion having a dispersed phase of an anionically stabilized hydroxylated polydiorganosiloxane, an organic tin compound, and a colloidal silica and a continuous phase of water in which the pH is 9.0 to 11.5. Upon removal of the water at ambient conditions, a crosslinked elastomeric product is formed. They teach that additional ingredients such as thickeners and fillers can be present to modify the properties of the emulsion or the elastomeric product. Colloidal clay is a suggested thickener. A wide variety of fillers are suggested for use as extending fillers, ultraviolet light screening agents, and pigments.

When the emulsion of Johnson et al. is extended with fillers, the resulting elastomeric product has many uses as a coating or caulking material.

SUMMARY OF THE INVENTION

An aqueous silicone elastomeric emulsion comprising an anionically stabilized hydroxyl endblocked polydiorganosiloxane, colloidal silica, alkyl tin salt, and clay, has 2 parts by weight or greater per 100 parts by weight of polydiorganosiloxane of zinc oxide added to the emulsion. The silicone elastomer formed upon drying this emulsion has improved heat stability compared to a similar silicone elastomer formed from an emulsion not containing the zinc oxide.

DESCRIPTION OF THE INVENTION

This invention relates to an aqueous silicone elastomeric emulsion consisting essentially of (A) 100 parts by weight of an anionically stabilized, hydroxyl endblocked polydiorganosiloxane, present as an oil-in-water emulsion, having a solids content of greater than 50 percent by weight, (B) from 1 to 50 parts by weight of colloidal silica, (C) from 0.1 to 2 parts by weight of alkyl tin salt, (D) from 20 to 150 parts by weight of clay, and (E) greater than 2 parts by weight of zinc oxide, the emulsion having a viscosity which makes it suitable as a caulking material.

In the process of developing useful products based upon the silicone emulsions that provide elastomeric products upon drying, it was found that using clay as a filler yielded emulsion which had the proper viscosity to permit use as caulking materials which could be stored in a conventional caulking cartridge and which could be extruded from the cartridge for use and curing. The cured caulking material could be painted. Most silicone caulking materials can not be painted because the cured surface will not wet with the paint or the paint will not adhere to the paint when dried.

When clay filled materials were used as caulking materials in applications which were subjected to elevated temperatures after curing, the physical properties were affected. When kaolin containing silicone elastomeric emulsions were cured and the cured elastomer was subjected to temperatures of 150° C., excessive weight loss and embrittlement resulted. It was discovered that the addition of 2 parts by weight or greater of finely divided zinc oxide to the emulsion per 100 parts by weight of polydiorganosiloxane greatly retarded the weight loss.

The starting emulsion used in this invention comprises water, an anionically stabilized hydroxyl endblocked polydiorganosiloxane, an alkyl tin salt, and colloidal silica, the emulsion having a pH in a range of 9 to 11.5 inclusive. Such an emulsion is described in U.S. Pat. No. 4,221,688, issued Sept. 9, 1980, of Johnson, Saam, and Schmidt, said patent being hereby incorporated by reference to describe the starting emulsion and how to manufacture it.

The hydroxyl endblocked polydiorganosiloxanes are those which can be emulsified and which impart elastomeric properties to the product obtained after the removal of the water from the emulsion. Such hydroxyl endblocked polydiorganosiloxanes should have a weight average molecular weight ($\overline{M}w$) of at least 10,000. Hydroxyl endblocked polydiorganosiloxanes with a lower $\overline{M}w$ range, such as 5000 to 10,000, do not provide strong elastomeric products. Preferred polydiorganosiloxanes have molecular weight above 50,000 $\overline{M}w$. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical. The most preferred $\overline{M}w$ for the hydroxylated polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom, that can include trace amounts of monoorganosiloxane or triorganosiloxane groups present as impurities of the manufacturing process. The preferred hydroxyl endblocked polydiorganosiloxanes are the hydroxyl endblocked polydimethylsiloxanes.

The most preferred hydroxyl endblocked polydiorganosiloxanes are those prepared by the method of anionic emulsion polymerization described by Findlay et al. In U.S. Pat. No. 3,294,725, issued Dec. 27, 1966, which is hereby incorporated by reference to show the methods of polymerization and to show the hydroxyl endblocked polydiorganosiloxane in emulsion. Another method of preparing hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes and their method of preparation. These methods and others are known in the art. The hydroxyl endblocked polydiorganosiloxanes used in the emulsion are those which are anionically stabilized. As used herein, "anionically stabilized" means the hydroxyl endblocked polydiorganosiloxane is stabilized in emulsion with an anionic surfactant.

Anionic surfactants are preferably the salt of the surface active sulfonic acids used in the emulsion polymerization to form the hydroxyl endblocked polydiorganosiloxane as shown in U.S. Pat. No. 3,294,725, cited above, which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids and aliphatically substituted diphenylethersulfonic acids.

One of the advantages of the emulsions described herein is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxyl endblocked polydiorganosiloxane. Other anionic emulsifying agents can be used, for example, alkali metal sulforicinates, sulfonated glyceryl esters of fatty acids, salts of sulfonated monovalent alcohol esters, amides of amino sulfonic acids such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate, and sodium lauryl ether sulfate.

Although not specifically required, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Colloidal silica is a required ingredient of the emulsions. Any of the colloidal silicas can be used. These colloidal silicas are well known in the art and many are commercially available. Although any of the colloidal silicas can be used including fumed colloidal silicas and precipitated colloidal silicas, the preferred colloidal silicas are those which are available in an aqueous medium. Colloidal silicas in an aqueous medium are usually available in a stabilized form, such as those stabilized with sodium ion, ammonia, or an aluminum ion. Aqueous colloidal silicas which have been stabilized with sodium ion are preferred because the pH requirement can be met by using such a sodium ion stabilized colloidal silica without having to add additional ingredients to bring the pH within the range of 9 to 11.5. The term "colloidal silica" as used herein are those silicas which have particle diameters of from 0.0001 to 0.1 micrometer. Preferably, the particle diameters of the colloidal silicas are from 0.001 to 0.05 micrometer. The relative amounts of hydroxyl endblocked polydiorganosiloxane and colloidal silica can vary over a wide range, such as from 1 part to 150 parts by weight of colloidal silica for each 100 parts by weight of hydroxyl endblocked polydiorganosiloxane. Amounts of colloidal silica from 1 to 50 parts by weight for each 100 parts by weight of hydroxyl endblocked polydiorganosiloxane are preferred in the method of the instant invention with from 1 to 25 parts by weight most preferred.

For this silicone emulsion to maintain a storage stability and also be curable to an elastomer after the emulsion is stored, the pH of the silicone emulsion must be within the range of 9 to 11.5 inclusive. The silicone emulsions which have the best storage stability and still have the ability to form elastomers at ambient conditions at any point during the storage stable period are those which have a pH in the range of 10.5 to 11.2.

A silicone emulsion of hydroxyl endblocked polydiorganosiloxane and colloidal silica does not provide a useful elastomeric product when the water is allowed to evaporate at ambient conditions immediately after the emulsion is prepared. An aging period is necessary before an elastomer can be formed from the emulsion, but such an aging period can take a long time, such as up to five months. The addition of an alkyl tin salt, preferably a dialkyltindicarboxylate, can be used to reduce the aging period to one to three days. After the aging period, an elastomeric product can be obtained by the removal of the water under ambient conditions. Alkyl tin salt can be used in amounts of from 0.1 to 2 parts by weight for each 100 parts by weight of the hydroxyl endblocked polydiorganosiloxane, preferably a dialkyltindicarboxylate in amounts of about 0.1 to 0.5 parts by weight is used. Dialkyltindicarboxylates include dibutyltindiacetate, dibutyltindilaurate, and dioctyltindilaurate. The preferred dialkyltindicarboxylate is dioctyltindilaurate.

The long-term storage stability of the emulsion has been found to be improved by the addition of an organic amine. The organic amine can be primary, secondary, or tertiary amines which contain carbon, hydrogen, and nitrogen, and can also contain oxygen, and which are water soluble in the amounts required. These organic amines include diethylamine, ethylenediamine, butylamine, hexylamine, morpholine, monoethanolamine, triethylamine, triethanolamine, and 2-amino-2-methyl-1-propanol. The preferred amines are diethylamine and 2-amino-2-methyl-1-propanol. The organic amines can be added neat or in aqueous emulsion provided that they do not cause the anionically stabilized hydroxyl endblocked polydiorganosiloxane emulsion to break during their addition. For this reason, it is preferable to add the amine as an aqueous solution.

A thickening agent can be used to adjust the viscosity of the emulsion. Suitable thickeners are available commercially and would be selected for their stability and usability in thickening the emulsion at a pH in the range of 9 to 11.5 inclusive. Some of the useful thickeners include the classes of cellulose derivatives, alkali salts of polyacrylates and polymethacrylates, sodium and ammonium salts of carboxylate copolymers, and colloidal clays.

The ingredients used in preparing the emulsion used in the method of this invention can be mixed together by any suitable means. In a simple batch operation, for instance, the anionically stabilized hydroxyl endblocked polydiorganosiloxane emulsion is placed in a mixing container, the colloidal silica in the form of a colloidal dispersion is added with mixing, the organic tin compound is also added in the form of an emulsion, clay is mixed in, and sufficient amine is added to adjust the pH to the required range, and the mixture is stirred until uniform. A thickening agent or other incidental additives can also be stirred in.

To obtain the preferred pH range of 10.5 to 11.2, it will usually require adjusting the pH after the siloxane polymer, colloidal silica, organic tin compound, clay, and any additional ingredients have been mixed. The pH is adjusted with the amine compound or with an alkali metal hydroxide or a combination thereof. The preferred alkali metal hydroxide is sodium hydroxide. For the purpose of this invention, the term "pH" means the electrical potential measured on commercially available glass electrodes designed for this purpose when the glass electrode is immersed in the emulsion. The electrode is calibrated with a standard buffer solution which gives a pH of 10.

Clay is used as a filler in the silicone emulsion of this invention because of the properties, discussed above, it gives to the emulsion and to the cured silicone elastomer obtained by drying the emulsion. These unique properties imparted by the clay are thought to be due to the colloidal nature of the clay particles. It is thought that all or most of the different types of clay are suitable in this invention, but the preferred type of clay is kaolinite or kaolin. The amount of kaolin preferred is from 20 parts to 150 parts by weight based upon 100 parts by weight of polydiorganosiloxane. Many useful products have been produced with from 20 to 50 parts by weight of kaolin.

Other fillers can be added to provide other properties such as pigmentation, ultraviolet light screening, and as extending filler. Examples include aluminum oxide, titanium dioxide, ground quartz, calcium carbonate, and various colorant pigments. These fillers should be finely divided, and it may be advantageous to use aqueous dispersions if they are commercially available. However, the silicone emulsions of this invention do not require that fillers be added in the form of aqueous dispersions. The silicone emulsion readily accepts the finely divided fillers in dry form.

The silicone elastomeric emulsion of the type described above having clay filler as an ingredient is a useful caulking material. When it is subjected to elevated temperatures however, for instance 150° C., the cured elastomer was unexpectedly found to lose weight and elasticity over a period of time. The rate at which this loss occurs has been found to be greatly reduced by the addition of greater than 2 parts by weight of finely divided zinc oxide based upon 100 parts by weight of polydiorganosiloxane to the emulsion. From 2 parts to 15 parts by weight of zinc oxide are preferred per 100 parts by weight of polydiorganosiloxane. Larger amounts can also be used but the improvement with succeeding portions becomes less as the amount of zinc oxide is increased.

The emulsion has a viscosity which makes it suitable as a caulking material. The emulsion is stored in a conventional caulking-type container, having a viscosity such that it can be extruded from the container at the time of use. When in place, as in a building opening, the emulsion can be either of the "flowable" or "non-slump" variety. A flowable emulsion, when placed into a horizontal opening would flow slightly under the force of gravity to form an intimate contact with the sides of the opening. If placed into a vertical opening, it would tend to flow out. For use in vertical openings, the emulsion viscosity is of the non-slump variety. By non-slump, it is meant that, when placed in contact with a vertical surface, the emulsion will remain in place while it is curing with only a slight amount of flow, such as 5 mm for instance. The viscosity of the emulsion is a function of the viscosity of the polydiorganosiloxane, the amount and type of colloidal silica and clay used, as well as the other fillers and thickeners which may be used.

The improved silicone elastomeric emulsion of this invention can be used to form caulking materials which are resistant to the effects of heating to elevated temperatures after drying. The cured elastomer can be used as a caulking material in a hot environment or in contact with hot surfaces.

The following example is presented for purposes of illustrating the invention and should not be construed as limiting the scope of the invention which is properly delineated in the claims.

EXAMPLE

A series of emulsions was prepared to illustrate the improved heat stability obtained by the addition of zinc oxide.

A base emulsion was prepared by mixing 640 g of an aqueous sodium stabilized colloidal silica having about 50 weight percent $SiO_2$ with 128 g of a 50 percent by weight solution of diethanol amine. Then 5328 g of an aqueous emulsion of an emulsion polymerized hydroxyl endblocked polydimethylsiloxane having a weight average molecular weight of about 325,000, being about 60 percent by weight solids, and having a pH of between 6.5 and 10.5, was added. Then 16 g of a tin emulsion containing 50 weight percent dioctyltindilaurate, 9 weight percent of a sodium alkylarylpolyether sulphonate and 41 percent water was added. This base emulsion was approximately 58.7 percent solids. It had a pH of greater than 9. The base emulsion was stored for 3 weeks at room temperature.

After the 3 week storage period, 6112 g of the base emulsion was mixed with 640 g of finely divided titanium dioxide, 1120 g of finely divided aluminum oxide, and 1440 g of kaolin having a median particle size of about 0.77 micrometers and a surface area of about 10 $m^2/g$. In order to prevent foaming during the mixing operation, 16 g of antifoam was added, the antifoam being a 30 weight percent emulsion of a polydimethylsiloxane/silica mixture in water. This filled emulsion had a solids content of about 73 percent by weight, with a pH of greater than 9.

A weighed sample of the emulsion was placed in an aluminum foil dish, dried, weighed again, and then heat aged in an air circulating oven at 150° C. At weekly intervals, the sample was removed and weighed and the loss of original dried weight was calculated. The results are shown in Table I.

Samples of the filled emulsion, 198 g each, were mixed with 2, 6, or 10 g of finely divided zinc oxide. These samples were then measured for weight loss as above with the results shown in Table I.

After 2 weeks at 150° C., the sample without the zinc oxide was embrittled. After 5 weeks, the samples containing zinc oxide were still flexible, showing the improvement in heat stability due to the presence of the zinc oxide.

A filled emulsion similar to those above, but containing aluminum oxide filler in place of the combination of aluminum oxide and kaolin, was prepared and tested in the same manner as a comparative example. This emulsion without the kaolin filler did not exhibit appreciable weight loss on heat aging at 250° C. The weight loss after 1 week was about 3.3 percent, after 5 weeks the weight loss was about 5.8 percent.

TABLE I

| Zinc Oxide, parts* | Weight Loss, percent | | | | |
|---|---|---|---|---|---|
| | 1 week | 2 week | 3 week | 4 week | 5 week |
| — | 15.4 | 33.0 | 45.6 | 46.4 | 46.7 |
| 2.9 | 3.9 | 7.9 | 13.7 | 18.5 | 22.8 |
| 8.8 | 3.9 | 6.8 | 11.8 | 15.6 | 19.5 |
| 14.7 | 3.6 | 6.6 | 11.3 | 14.6 | 18.3 |

*Parts by weight per 100 parts by weight of polydiorganosiloxane

That which is claimed is:

1. An aqueous silicone elastomeric emulsion consisting essentially of
   (A) 100 parts by weight based upon the solids content of an anionically stabilized, hydroxyl endblocked polydiorganosiloxane, present as an oil-in-water emulsion which has a solids content of greater than 50 percent by weight,
   (B) from 1 to 50 parts by weight of colloidal silica,
   (C) from 0.1 to 2 parts by weight of alkyl tin salt,
   (D) from 20 to 150 parts by weight of clay, and
   (E) greater than 2 parts by weight of zinc oxide, the silicone elastomeric emulsion having a pH of 9 to 11.5 inclusive and a viscosity which makes it suitable as a caulking material, said elastomeric emulsion having been aged for a time period such that an elastomeric product is formed upon removal of the water under ambient conditions.

2. The composition of claim 1 consisting essentially of
   (A) 100 parts by weight of an anionically stabilized hydroxyl endblocked polydiorganosiloxane, present as an oil-in-water emulsion which has a solids content of greater than 50 percent by weight,
   (B) from 1 to 25 parts by weight of colloidal silica,
   (C) from 0.1 to 0.5 part by weight of dialkyltin dicarboxylate,
   (D) from 20 to 50 parts by weight of kaolin, and
   (E) from 2 to 15 parts by weight of zinc oxide.

3. A method of producing a silicone elastomeric emulsion consisting essentially of mixing
   (A) 100 parts by weight of an anionically stabilized; hydroxyl endblocked polydiorganosiloxane, present as an oil-in-water emulsion which has a solids content of greater than 50 percent by weight,
   (B) from 1 to 50 parts by weight of colloidal silica,
   (C) from 0.1 to 2 parts by weight of alkyl tin salt,
   (D) from 20 to 150 parts by weight of clay, and
   (E) greater than 2 parts by weight of zinc oxide, to yield a mixture having a pH of 9 to 11.5 inclusive and having a viscosity which makes it suitable as a caulking material, then aging the mixture for a time period such that an elastomeric product is formed upon removal of the water under ambient conditions.

4. The method of claim 3 of producing a silicone elastomeric emulsion consisting essentially of mixing
   (A) 100 parts by weight of an anionically stabilized hydroxyl endblocked polydiorganosiloxane, present as an oil-in-water emulsion which has a solids content of greater than 50 percent by weight,
   (B) from 1 to 25 parts by weight of colloidal silica,
   (C) from 0.1 to 0.5 part by weight of dialkyltin dicarboxylate,
   (D) from 20 to 50 parts by weight of kaolin, and
   (E) from 2 to 15 parts by weight of zinc oxide.

5. The silicone elastomer obtained by drying the silicone elastomeric emulsion of claim 1, said elastomer having improved heat stability compared to a similar elastomer not containing the zinc oxide.

6. The silicone elastomer obtained by drying the silicone elastomeric emulsion of claim 2, said elastomer having improved heat stability compared to a similar elastomer not containing the zinc oxide.

* * * * *